United States Patent Office 3,252,924
Patented May 24, 1966

3,252,924
METHOD FOR PREPARING CELLULAR POLYURETHANE PLASTICS
Rudolf Merten, Cologne-Flittard, Otto Bayer, Leverkusen, and Gunther Braun, Cologne-Flittard, Germany, assignors to Farbenfabriken Bayer Aktiengesellschaft, Leverkusen, Germany, a German corporation
No Drawing. Filed Apr. 23, 1962, Ser. No. 189,290
Claims priority, application Germany, Apr. 29, 1961, F 33,816
12 Claims. (Cl. 260—2.5)

This invention relates to the preparation of cellular polyurethane plastics and more particularly to a method of preparing rigid cellular polyurethane plastics.

It has been heretofore known to prepare polyurethane foam materials using numerous processes employing various types of polyhydroxyl compounds, polyisocyanates and blowing agents. It has also been known to prepare adducts of colophony resins and unsaturated carboxylic acids or derivatives thereof for use in the production of lacquers and synthetic resins. However, the concurrent use of the polycyclic colophony resin generally leads to hard, brittle reaction products.

It is, therefore, an object of this invention to provide an improved method of making cellular polyurethane plastics. It is another object of this invention to provide an improved process for making rigid cellular plastics. It is a further object of this invention to provide an improved method of making cellular polyurethane plastics utilizing colophony resins.

The foregoing objects and others which will become apparent from the following description are accomplished in accordance with the invention, generally speaking, by providing cellular polyurethane plastics by reacting an organic compound containing active hydrogen atoms which are reactive with —NCO groups and organic polyisocyanates in a reaction mixture containing an inert gas wherein the organic compound containing active hydrogen atoms is an addition product of a dienophilic unsaturated monocarboxylic acid, a polycarboxylic acid or an alcohol with colophony resins. Thus, the invention contemplates the use of addition products of colophony resins with dienophilic compounds which may also be esterified with polyhydric alcohols in the reaction with polyisocyanates to prepare polyurethanes.

Surprisingly, the viscosity of these modified colophony resins is not very high. They can be processed very satisfactorily with polyisocyanates and the addition of suitable blowing agents and other known auxiliaries to form foam materials which have a low degree of brittleness and good adhesion, while still having satisfactory physical values.

The production of the polyhydroxyl compounds used according to the present process for the production of a foam material is effected by a Diels-Alder addition between the colophony resin and the dienophilic carboxylic acids, derivatives or alcohols. Further, an additional esterification or trans-esterification between the carboxyl groupings present in the colophony resin and the unsaturated carboxylic acids used and a polyhydric alcohol may also be conducted. Temperatures of from about 150 to about 210° (all temperatures given throughout the specification are given in ° C.) can be used for the Diels-Alder addition reaction, while the esterification or trans-esterification, depending on circumstances, can require temperatures between about 40 and about 300°. After the preparation of the addition product however, temperatures higher than about 225° should be avoided to prevent a splitting back of the addition product. The two reactions can take place successively or also simultaneously without any influence on one another. In many cases, the concurrent use of trans-esterification or esterification catalysts, such as titanium alcoholates, lead oxide, sodium carbonate or toluene-sulphonic acid is advantageous.

Colophony resins, i.e., rosin, useful in accordance with the present invention, are generally described as resinic acids obtained from natural substances such as the oleoresin or stump wood of pine trees, which consist for the major part of abietic acid and of smaller proportions of analogues and isomeric acids, such as d- or l-pimaric acid. It is of course also possible to use the pure resinic acids, especially abietic acid ester, in accordance with the aforementioned invention. The nature, chemical composition and derivation of colophony resins are more particularly described in the Encyclopedia of Chemical Technology, volume 11, pages 779 to 808, published by Interscience Publishers, Inc., the subject matter of which is incorporated herein by reference.

Any suitable organic compound containing an ethylenically unsaturated double bond in the molecule which will react as a dienophile may be used to modify the colophony resins. However, it is preferred that unsaturated carboxylic acids, the derivative thereof such as anhydrides, esters, acids, halides; and unsaturated alcohols be used. Carboxylic acids or the derivatives thereof reacting as dienophiles and having at least one activated double bond, primarily acids and anhydrides with an $\alpha,\beta$-unsaturated grouping are most preferred. Suitable dienophilic compounds include for example acrylic acid, methacrylic acid, crotonic acid, maleic acid, fumaric acid, itaconic acid, aconitic acid, sorbic acid and chloromaleic acid, as well as their esters with low alcohols, such as methanol, ethanol or butanol, their acid chlorides and their anhydrides; higher acids with conjugated double bonds possibly formed in situ, such as, for example, linoleic and linolenic acid, ricinoleic acid and the like. It is of course also possible to use technical mixtures of the aforesaid unsaturated fatty acids, for example ricinenic fatty acids, linseed fatty acids or tall oil fatty acids. Suitable dienophilic alcohols such as, for example, 1,4-butene diol, allyl alcohol, and the like may be used.

When using dienophilic compounds which are easily polymerized, it is advantageous to incorporate polymerization inhibitors, such as, for example, hydroquinone, tertiary butyl pyrocatechol or phenthiazines.

As stated previously, an esterification or trans-esterification may be conducted successively or simultaneously with the Diels-Alder addition. Any suitable polyhydric alcohols including dihydric and polyhydric alcohols of aliphatic, cycloaliphatic, aromatic or heterocyclic nature may be used such as, for example, ethylene glycol, diethylene glycol, triethylene glycol, polyethylene glycols, propylene glycol, dipropylene glycol, tripropylene glycol, propane-1,3-diol, butane-1,2-diol, butane-1,3-diol, butane-1,4-diol and butane-2,3-diol, hexane-1,6-diol, octadecane diol and octadecene diol, butene-1,4-diol and butine-1,4-diol, glycerine, trimethylol propane, trimethylol ethane, pentaerythritol, hexane triols, mannitol, sorbitol, glucose, fructose, mannose, cane sugar, invert sugar, solutions of invert sugar in polyalcohols, degraded starches, cyclohexane-1,4-dimethylol, oxyalkylated hydroquinone or diphenylol alkanes, and also amino alcohols such as triethanolamine, oxalkylated ethylene diamines or phenylene diamines and the like. The polyhydric alcohols which are used can also have a relatively high molecular weight, such as, castor oil, hydroxyl polyesters of the above polyalcohols and polycarboxylic acids, such as any of the above-mentioned polycarboxylic acids also adipic acid, sebacic acid, oxalic acid, pimelic acid, succinic acid, 1,2,4-benzene tricarboxylic acid, phthalic acid, and the like; polyhydric polyalkylene ethers such as polyalkylene glycol ethers with —OH contents above 5%, polythioethers and polyacetals with —OH contents above 5%, such as those described in U.S. patent application Serial Number 71,175, filed Nov. 23, 1960, now U.S. Patent No. 3,202,620. However, when using the polyacetals, temperatures higher than 100° should not be exceeded in the subsequent condensation. Aminoalcohols with functional amino groups such as, for example, aminoethyl alcohol, aminopropyl alcohol and the like can in principle also be used, but these lead to higher viscosities and are consequently of subordinate importance; similarly, small quantities of monofunctional alcohols such as methanol, ethanol, propanol and the like can be added during the condensation for modification purposes or remain during the trans-esterification in the polyhydroxyl compound.

Another modification consists in the concurrent use of polycarboxylic acids such as phthalic acid, adipic acid, sebacic acid, dimerized and trimerized fatty acids, succinic acid, terephthalic acid, in the esterification.

The quantitative ratios during the production of the polyhydroxyl compounds are preferably to be chosen that at least 1 mol of the dienophilic compound is used per mol of the diene component present in the colophony resin. The quantity of polyhydric alcohol depends largely on the nature of the final product which is required. Thus, polyhydroxyl compounds with lowest possible acid numbers can be prepared by suitable choice of the esterification conditions and by using excess alcohol; in this case, about 1 mol of polyhydric alcohol will be used per mol of introduced carboxyl grouping in order to avoid a formation of condensates of relatively high viscosity, whereas at least two hydroxyl equivalents per carboxyl equivalent will be used when employing polyhydric alcohols of higher molecular weight. On the other hand, products with higher acid numbers can also be produced, by not completing the esterification or, with the use of anhydrides of unsaturated acids, by merely effecting an addition of the polyhydric alcohol to the anhydride group. This possibility is to be particularly considered for polyhydric alcohol components showing low heat resistance, such as polyacetals or possibly also carbohydrates.

The polyhydroxyl compounds, or also the intermediates obtained in the preparation of the adducts of unsaturated acids or alcohol component and colophony resin, can be subjected to a further modification, such as, for example, the addition of halogens, preferably chlorine or bromine, or to a hydrogenation.

The polyhydroxyl compounds obtained, i.e., the starting components for the process according to the invention, constitute light yellow to brown substances which are generally of low viscosity, and these substances are reacted with polyisocyanates in a reaction mixture containing a blowing agent such as water, trichlorofluoromethane, dichlorodifluoromethane, dichlorofluoromethane, dichlorofluoroethane, difluorobromoethane, difluorodibromomethane, difluorodichloroethane and the like.

The modified colophony resins can also be mixed with other known polyhydroxyl compounds, such as hydroxyl polyesters, polyhydric polyalkylene ethers, polythioethers, polyacetals, adducts of alkylene oxides such as, ethylene oxide, propylene oxide with polyamines such as tolylene diamine, ethylene diamine, cyclohexylene diamine and the like.

Any suitable hydroxyl polyester may be used such as, for example, the reaction product of a polycarboxylic acid and a polyhydric alcohol. Any suitable polycarboxylic acid may be used in the preparation of a polyester such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, diethylene glycol, propylene glycol, butylene glycol, hexane diol, hexane triol, glycerine, bis-(hydroxy-methylcyclohexane), trimethylol propane, pentaerythritol and the like.

Any suitable polyhydric poly(alkylene ether) may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 1, pages 257 to 262 published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

These compounds may also be used in the esterification of the Diels-Alder adduct as described above. The starting materials to be used according to the invention should have an —OH content of about 5–18%.

Any suitable organic polyisocyanate may be utilized in the process of this invention such as, for example, aliphatic polyisocyanates, aromatic polyisocyanates, alicyclic polyisocyanates, and heterocyclic polyisocyanates including such as, for example, Ethylene diisocyanate,
Ethylidene diisocyanate,
Propylene diisocyanate,
Butylene diisocyanate,
Cyclopentylene-1-3-diisocyanate,
Cyclohexylene-1,4-diisocyanate,
Cyclohexylene-1,2-diisocyanate,
2,4-tolylene diisocyanate,
2,6-tolylene diisocyanate,
4,4'-diphenylmethane diisocyanate,
2,2-diphenylpropane-4,4'-diisocyanate,
p-Phenylene diisocyanate,
m-Phenylene diisocyanate,
Xylylene diisocyanate,
1,4-naphthylene diisocyanate,
1,5-naphthylene diisocyanate,
Diphenyl-4,4'-diisocyanate,
Azobenzene 4,4'-diisocyanate,
Diphenyl sulfone-4,4'-diisocyanate,
Dichlorohexamethylene diisocyanate,
Tetramethylene diisocyanate,
Pentamethylene diisocyanate,
Hexamethylene diisocyanate,
Furfurylidene diisocyanate,
1-chlorobenzene-2,4-diisocyanate, Tri-isopropyl benzene diisocyanate,
p-Isocyanatophenyl-thiophosphoric acid triester,
p-Isocyanatophenyl-phosphoric acid triester,
1-(isocyanatophenyl)-ethyl isocyanate,
4,4',4"- triisocyanato triphenyl methane,
1,3,5-triisocyanato benzene,
2,4,6-triisocyanate toluene,
4,4'-dimethyl diphenyl methane-2,2', 5,5'-tetraisocyanate
and the like; polyisocyanates of the above type which are substituted by various substituents such as OR, $NO_2$, Cl where R is lower alkyl such as methyl, ethyl, butyl, hexyl, the reaction products of the above isocyanates with less than equivalent quantities of polyhydroxyl compounds such as trimethylol propane, hexane triol, glycerine, butane diol; polyisocyanates which are masked with phenols or bisulphite; polymerized isocyanates with isocyanurate rings, uretdiones and the like.

The quantity of polyisocyanate which is used should in general be at least equivalent to the existing sum of hydroxyl and carboxyl groups. With additional use of water as blowing component, corresponding quantities of excess isocyanate adapted to the water content is used. On the other hand, additional excess proportions of isocyanate groups can be incorporated by polymerization or secondary addition reactions into the foam structure. Instead of or in addition to the foaming with polyisocyanate/water combinations, it is also possible to use other blowing agents, such as azo compounds, low-boiling hydrocarbons, halogenated methanes or ethanes, vinylidene chloride and those more particularly set forth above.

The foaming is preferably carried out in the presence of catalysts, for example, amines such as triethylamine, dimethylbenzylamine, 1-dimethylamino-3-ethoxy-propane, triethylene diamine, or metal salts such as tin-(II)-acylates, dialkyl-tin-(IV)-acylates, acetylacetonates of heavy metals, molybdenum glycolate. Other additional substances are emulsifiers, for example, oxethylated phenols of biphenylols, higher sulphonic acids, sulphuric acid esters of castor oil or ricinoleic acid, ammonium salts of oleic acid, foam stabilizers such as alkylene oxide-siloxane copolymers, basic silicone oils or paraffins, dyestuffs, pigments, flame-proofing agents and the like. The alkylene oxide-siloxane copolymers having the formula

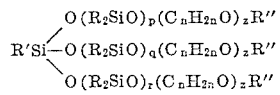

wherein R, R' and R" are alkyl radicals having one to four carbon atoms; p, q and r are integers each having a value of from four to eight and $(C_nH_{2n}O)_z$ is a mixed polyoxyethylene oxypropylene group containing from 15 to 19 oxyethylene units and from 11 to 15 oxypropylene units with z equal to from about 26 to about 34 is particularly advantageous. Organo-silicones of this type and a method of making them are disclosed in U.S. Patent 2,834,748.

Although all silicone compounds represented by the general formula given above are contemplated for use in the method of this invention, the preferred organo-silicone compounds have the formula:

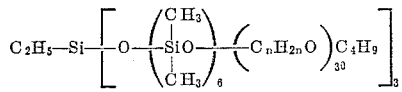

wherein $(C_nH_{2n}O)$ is a mixed polyoxyethylene and oxypropylene block copolymer containing about 17 oxyethylene units and 13 oxypropylene units.

The foam materials are produced in known manner by mechanical or manual mixing of the components and excellent foam materials are obtained which have high mechanical values, low brittleness, good adhesion, satisfactory pore structure and a low shrinkage tendency. In addition, the systems show a good mutual compatibility, also with respect to the halogenated methane and ethane derivatives frequently used as blowing agents. The cellular products prepared in accordance with this invention find particular use in sound and heat insulating applications such as curtain wall constructions and the like.

The invention is further illustrated by the following examples in which parts are by weight unless otherwise specified.

PRODUCTION OF THE POLYHYDROXYL COMPOUNDS

(A1)

About 604 parts of colophony resin WW and about 960 parts of triethylene glycol are heated to about 120° and, at this temperature, about 214 parts of maleic acid anhydride are introduced. After adding about 0.1 part of titanium tetrabutylate, the combination is esterified at a temperature of about 190° and a pressure of about 45 mm. Hg for about 15 hours. There are obtained about 1584 parts of a light yellow polyhydroxyl compound with a viscosity of 6600 cp./25° and a theoretical hydroxyl content of 6.5%.

(A2)

About 604 parts of rosin WW and about 215 parts of maleic acid anhydride are heated under nitrogen for three hours to from about 170 to about 180° and then about 860 parts of technical hexane triol are added at a temperature of about 170°. After adding about 0.1 part of titanium tetrabutylate, the esterification is completed at about 190° and about 100 mm. Hg over a period of about 12 hours. There are obtained about 1542 parts of a highly viscous polyester with a theoretical hydroxyl content of about 13.8%.

(A3)

About 172 parts of cane sugar, about 75 parts of triethylene glycol, about 100 parts of water and about 0.5 part of a 30% $HBF_4$ are heated for three hours to about 90°. At the same temperature, the water is removed in vacuo. Then about 98 parts of maleic acid anhydride are added at about 90°, the mixture is stirred for about 15 minutes and then an additional quantity of about 300 parts of triethylene glycol and about 302 parts of rosin WW are added. The esterification is carried out at about 190° and about 40 mm. Hg and leads to about 882 parts of a dark brown polyester with a viscosity of 9400 cp./50° and a theoretical hydroxyl content of about 9.5%.

(A4)

About 216 parts of maleic acid anhydride are introduced into a mixture of about 604 parts of rosin WW, about 750 parts of triethylene glycol and about 188 parts of trimethylol propane at from about 110 to about 130° and, after adding about 0.1 part of titanium tetrabutylate, the mixture is esterified up to about 190° and 40 mm. Hg. By this means, there are obtained about 1670 parts of a light yellow polyester with a viscosity of 1300 cp./50° and a hydroxyl content of about 7.9%.

(A5)

About 604 parts of rosin WW and about 214 parts of maleic acid anhydride are heated for three hours under nitrogen to about 180°, then about 660 parts of diethylene glycol are slowly added in about 30 minutes and esterification takes place up to about 190° at 170 mm. Hg over a period of about 25 hours. There are obtained about 1410 parts of a light yellow polyester with a viscosity of about 9300 cp./25° and a hydroxyl content of about 7.4%.

(A6)

Following the production of the corresponding product in accordance with A1, about 210 parts of bromine are additionally introduced dropwise at a temperature of about 120°, proportionally to the addition. The bromine is completely added; a brominated polyhydroxyl compound is obtained with a yield of about 1790 parts, a hydroxyl content of about 6.1% and an acid number of 47. The viscosity is 3900 cp./25°.

(A7)

About 343 parts of cane sugar and about 106 parts of diethylene glycol are inverted for about four hours at about 90° with about 200 parts of water and about 0.4 part of a 30% HBF₄. The water is removed in vacuo at 90°. Then about 214 parts of maleic acid anhydride are added, the mixture is stirred for about 30 minutes at about 90° and then about 742 parts of diethylene glycol, about 416 parts of adipic acid and about 604 parts of rosin B are introduced. After adding about 0.1 part of titanium tetrabutylate, the mixture is esterified up to a temperature of about 190° and a vacuum of about 80 mm. Hg over a period of about 15 hours. There are obtained about 1982 parts of a dark brown polyester with a viscosity of 26,300 cp./25° and 8.8% —OH.

(A8)

About 150 parts of methyl maleinate, about 302 parts of rosin WW, about 450 parts of triethylene glycol and about 0.1 part of titanium tetrabutylate are heated for about four hours to about 180°. The temperature is slowly raised to about 190° and the esterification is completed over a period of about 15 hours up to a vacuum of about 60 mm. Hg. As reaction product, there are obtained about 800 parts of a light yellow polyester with a viscosity of about 2450 cp./25°. About 100 g. of this ester consume about 61.6 g. of phenylisocyanate.

(A9)

About 302 parts of rosin WW, about 300 parts of triethylene glycol, about 1 part of tertiary butyl pyrocatechol are heated to about 180° and about 100 parts of methyl methacrylate are introduced dropwise over the period of about 10 hours. About 0.1 part of titanium tetrabutylate is then added and the esterification is completed at about 190° and 40 mm. Hg. The reaction product is obtained in a yield of about 634 parts with a viscosity of 1150 cp./25°. The consumption of phenylisocyanate is 68.4 g./100 g. of ester.

(A10)

About 450 parts of triethylene glycol, about 302 parts of rosin WW, about 130 parts of itaconic acid, and about 0.1 part of titanium alcoholate are esterified at about 190° and 40 mm. Hg and as reaction product, there are obtained about 826 parts of a light yellow polyester with a viscosity of 1070 cp./25° and a theoretical hydroxyl content of about 6.2%.

(A11)

About 176 parts of 2-butene-1,4-diol and about 604 parts of rosin WW are heated for about 6 hours with nitrogen to about 170°. About 300 parts of triethylene glycol and about 0.5 ml. of titanium tetrabutylate are added and esterification is carried out in vacuo up to about 190°. There are obtained about 1024 parts of a light yellow polyhydroxyl compound with a viscosity of about 2080 cp./25°, which uses 72.5 g. of phenylisocyanate per 100 g.

(A12)

About 1290 parts of a polyacetal consisting of 1 mol of cane sugar, 8 mols of formaldehyde and 6 mols of diethylene glycol and having a hydroxyl content of about 13.2% are heated to about 90° and about 400 parts of an adduct prepared by heating for four hours to 180° under nitrogen from about 2420 parts of rosin WW and about 800 parts of maleic acid anhydride are slowly introduced. The temperature is thereafter kept for another 10 hours at about 90°, the added resin being dissolved. The adduct which is obtained has an acid number of 65 and consumes 61 g. of phenylisocyanate to 100 g. of substance.

(A13)

About 1510 parts of methyl abietate and about 500 parts of maleic acid anhydride are heated under nitrogen for about three hours to about 170°. About 2250 parts of triethylene glycol and about 0.1 part of lead oxide are then added and esterification takes place up to about 180°/20 mm. There are obtained about 4210 parts of a polyhydroxyl compound with a viscosity of about 1765 cp./25°, which uses 59.1 g. of phenylisocyanate to 100 g. of substance.

(A14)

About 343 parts of cane sugar, about 1600 parts of triethylene glycol and about 1 part of 30% HBF₄ are heated for about four hours to about 90°. About 400 parts of maleic acid anhydride are then introduced at about 90° and the mixture is heated to about 130°. At this temperature, about 1250 parts of rosin B are added and esterification takes place up to about 160°/12 mm. Hg. There are obtained about 3400 parts of a brown polyhydroxyl compound with a viscosity of 14,200 cp./25°. This compound uses 69 g. of phenylisocyanate to 100 g. of substance.

(A15)

About 100 parts of maleic acid anhydride are introduced first at 130° into a mixture of about 686 parts of cane sugar and about 636 parts of diethylene glycol, and about 302 parts of rosin WW are then added. The mixture is heated to about 170° for about three hours, then cooled to about 130° and about 292 parts of adipic acid and about 590 parts of distilled rape oil fatty acid (acid number about 191) are then added. After addition of about 0.2 part of titanium tetrabutylate the mixture is esterified at about 170°/12 mm. Hg. There is obtained a brown-colored polyester with a hydroxyl content of about 6.5 percent, an acid number of about 39, a saponification number of about 239 and a viscosity of about 45,000 cp./25°.

(A16)

About 800 parts of triethylene glycol, about 0.5 part of HBF₄ (about 30 percent) are reacted at about 90° with about 343 parts of cane sugar, stirred at about 90° for about four hours and then heated to about 130°. At this temperature about 200 parts of maleic acid anhydride and later about 603 parts of rosin WW as well as 0.3 part of titanium tetrabutylate are added. The mixture is kept at about 170° for about four hours in a slight vacuo depending on the amount of water distilling off, and about 564 parts of oleic acid are run in within about two hours. The mixture is esterified at about 170° up to a vacuum of 12 mm. Hg. The resulting polyester has a hydroxyl content of about 6.1 percent, an acid number of about 61 and a saponification number of about 169.

(A17)

In the process described in A16 about 282 parts only of oleic acid are added instead of about 564 parts of oleic acid. Under otherwise equal conditions there is obtained a polyester with a hydroxyl content of 7.4 percent, an acid number of about 70, a saponification number of about 211 and a viscosity of about 26,000 cp./25°.

(A18)

About 300 parts of maleic acid anhydride and about 1150 parts of rosin B are added at about 130° to about 2850 parts of polyethylene glycol (about 18 percent hydroxyl content). After addition of about 0.4 part of titetrabutylate the mixture is esterified up to about 170°/15 mm. Hg. A polyester is obtained with a viscocity of about 900 cp./25° and an isocyanate consumption of about 69 g. of phenyl isocyanate per about 100 g. of ester.

(A19)

About 300 parts of maleic acid anhydride and about 1200 parts of rosin B are introduced at about 130° into a mixture of about 1500 parts of polyethylene glycol (hydroxyl content about 17.8 percent) and about 500 parts of diethylene glycol. About 0.3 part of titanium tetrabutylate are added as catalyst, the mixture is heated to about 170° for about four hours and then condensed at about 160°/15 mm. Hg for about ten hours. The resulting polyester has a viscosity of about 2950 cp./25° and an isocyanate consumption of about 75 g. of phenyl isocyanate per about 100 g. of ester.

(A20)

About 1450 parts of polyethylene glycol (hydroxyl content about 18.1 percent) and about 220 parts of tall oil fatty acid are reacted at about 130° with about 150 parts of maleic acid anhydride with about 600 parts of rosin B according to A18. Esterification is carried out at about 170°/25 mm. Hg and yields an ester with a viscosity of about 520 cp./25° and an isocyanate consumption of about 65 g. of $C_6H_5NCO$/100 g. of ester.

(A21)

About 600 parts of tall oil fatty acid (acid number about 182) and about 680 parts of triethylene glycol are heated to about 140°, and about 600 parts of rosin B are added thereto. Esterification is carried out in the presence of 0.5 part of titanium tetrabutylate up to about 180°/15 mm. Hg in vacuo. A thinly viscous polyester is obtained with a viscosity of about 360 cp./25° and an isocyanate consumption of about 46 g. of phenyl isocyanate per about 100 g. of ester.

*Example 1*

About 80 parts of the polyhydroxyl compound A1 are mixed with about 20 parts of a propoxylated ethylene diamine having a hydroxyl number of 450. This mixture is mixed by stirring with about 0.3 part of polysiloxane polyalkylene glycol ester having the formula

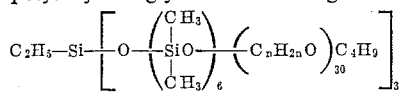

wherein $(C_nH_{2n}O)$ is a mixed polyoxyethylene and oxypropylene block copolymer containing about 17 oxyethylene units and 13 oxypropylene units, and about 6 parts of sodium castor oil sulphate containing 50% of water. Foaming thereafter takes place with addition of about 116 parts of crude 4,4'-diphenylmethane diisocyanate (90%). A tough foam material is obtained which has the following physical properties:

Weight per unit volume _____ kg./m.³__ 33
Compressive strength _____ kg./cm.²__ 1.6
Impact toughness _____ kg./cm__ 0.7
Hot bending strength _____ ° C__ 110
Water absorption _____ percent__ 3

*Example 2*

About 50 parts of the polyhydroxyl compound A2 are mixed with about 50 parts of the polyacetyl from 1 mol of cane sugar, 8 mols of formaldehyde and 6 mols of diethylene glycol (9.5% —OH). An activator mixture consisting of about 1.5 parts of permethylated aminoethyl piperazine, about 0.3 part of the polysiloxane polyalkylene glycol ester of Example 1 and about 6 parts of sodium castor oil sulphate having 50% water is incorporated by stirring with about 145 parts of 4,4'-diphenylmethane diisocyanate (90%) into the first mixture. A hard foam material is obtained which has the following mechanical values:

Weight per unit volume _____ kg./m.³__ 38
Compressive strength _____ kg./cm.²__ 2.4
Impact toughness _____ kg./cm__ 0.2
Hot bending strength _____ ° C__ 161
Water absorption _____ percent__ 1.6

*Example 3*

About 100 parts of polyhydroxyl compound A3 are mixed by stirring with about 1 part of permethylated aminoethyl piperazine, about 0.3 part of the polysiloxane polyalkylene glycol ester of Example 1 and about 6 parts of sodium-castor oil sulphate (50% water). This mixture is foamed with addition of about 129 parts of 4,4'-diphenylmethane diisocyanate (90%). A non-shrinking hard foam material is obtained which has the following physical values:

Weight per unit volume _____ kg./m.³__ 38
Compressive strength _____ kg./cm.²__ 2.5
Impact toughness _____ kg./cm__ 0.4
Hot bending strength _____ ° C__ 124
Water absorption _____ percent__ 2.0

*Example 4*

About 100 parts of polyhydroxyl compound A4 are thoroughly mixed by stirring with an activator mixture consisting of about 1 part of permethylated aminoethyl piperazine, about 0.3 part of the polysiloxane polyalkylene glycol ester of Example 1 and about 6 parts of sodium-castor oil sulphate having about 50% water. This mixture, with the addition of about 115 parts of 4,4'-diphenylmethane diisocyanate (90%), is introduced into molds in which is formed a fine-pored foam material with the following mechanical values:

Weight per unit volume _____ kg./m.³__ 42
Compressive strength _____ kg./cm.²__ 2.9
Impact toughness _____ kg./cm__ 0.7
Hot bending strength _____ ° C__ 105
Water absorption _____ percent____ 2

*Example 5*

About 80 parts of polyhydroxyl compound A5 are thoroughly mixed with about 20 parts of a propoxylated ethylene diamine having a hydroxyl number of about 540, about 0.3 part of the polysiloxane polyalkylene glycol ester of Example 1 and about 6 parts of sodium-castor oil sulphate having 50% water. About 120 parts of 4,4'-diphenylmethane diisocyanate (90%) are added. The hard foam material which is formed has the following physical properties:

Weight per unit volume _____ kg./m.³__ 43
Compressive strength _____ kg./cm.²__ 1.7
Impact toughness _____ kg./cm__ 0.3
Hot bending strength _____ ° C__ 103
Water absorption _____ percent__ 3

*Example 6*

About 80 parts of polyhydroxyl compound A4 are thoroughly mixed with about 20 parts of propoxylated ethylene diamine and about 0.5 part of the polysiloxane polyalkylene glycol ester of Example 1. About 92 parts of 4,4'-diphenylmethane diisocyanate (90%) containing about 30 parts of trichlorofluoromethane as blowing agent, are added to the mixture. A hard foam material with very fine pores is obtained, this having the following mechanical values:

Weight per unit volume _____ kg./m.³__ 30
Compressive strength _____ kg./cm.²__ 2.6
Impact toughness _____ kg./cm__ 0.3
Water absorption _____ percent__ 1.4
Hot bending strength _____ ° C__ 115

*Example 7*

About 70 parts of polyhydroxyl compound A6 are thoroughly mixed with about 30 parts of polyester having an hydroxyl number of 370 prepared from adipic acid, phthalic acid anhydride, oleic acid and trimethylol propane, about 2 parts of permethylated aminoethyl piperazine, about 0.3 part of the polysiloxane polyalkylene glycol ester of Example 1 and about 6 parts of sodium-castor oil sulphate having 50% water. The mixture is foamed with addition of about 114 parts of 4,4'-diphenylmethane diisocyanate (90%). A non-shrinking hard foam material is obtained which has the following physical properties:

Weight per unit volume _____ kg./m.³__ 34
Compressive strength _____ kg./cm.²__ 1.6
Impact toughness _____ kg./cm__ 0.5
Water absorption _____ percent__ 3.2
Hot bending strength _____ ° C__ 112

*Example 8*

About 100 parts of polyhydroxyl compound A7 are mixed with about 1 part of permethylated aminoethyl piperazine, about 0.3 part of the polysiloxane polyalkylene glycol ester of Example 1 and about 6 parts of sodium-castor oil sulphate having 50% of water. The mixture is foamed with the addition of about 148 parts of 4,4'-diphenylmethane diisocyanate (90%). A hard foam material is obtained which has the following properties:

Weight per unit volume _____ kg./m.³__ 39
Compressive strength _____ kg./cm.²__ 2.7
Impact toughness _____ kg./cm__ 0.5
Water absorption _____ percent__ 3.7
Hot bending strength _____ ° C__ 131

*Example 9*

About 70 parts of polyhydroxyl compound A8 are mixed with about 30 parts of a polyester having an hydroxyl number of 370 prepared from adipic acid, phthalic acid anhydride, oleic acid and trimethylol propane, about 1.5 parts of permethylated aminoethyl piperazine, about 0.5 part of the polysiloxane polyalkylene glycol ester of Example 1 and about 30 parts of trichlorofluoromethane. After incorporating about 79 parts of 4,4'-diphenylmethane diisocyanate (90%) by stirring, the mixture is introduced into molds, in which is formed a fine-pored hard foam material with the following physical characteristics:

Weight per unit volume _____ kg./m.³__ 31
Compressive strength _____ kg./cm.²__ 1.2
Impact toughness _____ kg./cm__ 0.3
Water absorption _____ percent__ 2.5
Hot bending strength _____ ° C__ 92

*Example 10*

About 100 parts of polyhydroxyl compound A9 are mixed by stirring with about 1 part of permethylated aminoethyl piperazine, about 0.3 part of the polysiloxane polyalkylene glycol ester of Example 1 and about 6 parts of sodium-castor oil sulphate having 50% water. The mixture is foamed with the addition of about 135 parts of 4,4'-diphenylmethane diisocyanate (90%). A hard foam material is obtained which has the following mechanical values:

Weight per volume _____ kg./m.³__ 37
Compressive strength _____ kg./cm.²__ 2.4
Impact toughness _____ kg./cm__ 0.3
Water absorption _____ percent__ 3.2
Hot bending strength _____ ° C__ 123

*Example 11*

About 90 parts of polyhydroxyl compound A10 are thoroughly mixed by stirring with about 10 parts of a propoxylated ethylene diamine having an hydroxyl number of 450, about 0.5 part of permethylated aminoethyl piperazine, about 0.5 part of the polysiloxane polyalkylene glycol ester of Example 1 and about 30 parts of trichlorofluoromethane. With the addition of about 88 parts of 4,4'-diphenylmethane diisocyanate (90%), the mixture is poured into molds and foamed to form a hard foam material with the following physical properties:

Weight per unit volume _____ kg./m.³__ 28
Compressive strength _____ kg./cm.²__ 1.3
Impact toughness _____ kg./cm__ 0.4
Water absorption _____ percent__ 2.7
Hot bending strength _____ ° C__ 102

*Example 12*

About 70 parts of polyhydroxyl compound A11 are thoroughly mixed with about 30 parts of propoxylated trimethylol propane having an hydroxyl number of 380 and about 2 parts of permethylated aminoethyl piperazine, about 6 parts of sodium-castor oil sulphate having 50% water and about 0.3 part of the polysiloxane polyalkylene glycol ester of Example 1. After adding about 145 parts of 4,4'-diphenylmethane isocyanate (90%), the mixture is introduced into molds, in which it forms a fine-pored and non-shrinking hard foam material.

*Example 13*

About 80 parts of polyhydroxyl compound A12 are thoroughly mixed by stirring with about 20 parts of a propoxylated ethylene diamine having an hydroxyl number of 450, about 1 part of permethylated aminoethyl piperazine, about 6 parts of sodium-castor oil sulphate having 50% water and about 0.3 part of the polysiloxane polyalkylene glycol ester of Example 1. After adding about 122 parts of 4,4'-diphenylmethane diisocyanate (90%) there is formed a non-shrinking hard foam material with the following mechanical values:

Weight per unit volume _____ kg./m.³__ 27
Compressive strength _____ kg./cm.²__ 1
Impact toughness _____ kg./cm__ 0.3
Hot bending strength _____ ° C__ 118
Water absorption _____ percent__ 4

*Example 14*

About 100 parts of the polyhydroxyl compound A13 are mixed with about 1.5 parts of permethylated aminoethyl piperazine about 6 parts of sodium castor oil sulphate having 50% water and about 0.3 part of the polysiloxane polyalkylene glycol ester of Example 1. After about 112 parts of 4,4'-diphenylmethane diisocyanate (90%) have been thoroughly incorporated by stirring, a fine-pored and non-brittle hard foam material is formed, which has the following values:

Weight per unit volume _____ kg./m.³__ 42
Compressive strength _____ kg./cm.²__ 2.7
Impact toughness _____ kg./cm__ 1.1
Hot bending strength _____ ° C__ 120
Water absorption _____ percent__ 3.5

*Example 15*

About 100 parts of polyhydroxyl compound A14 are thoroughly mixed with about 1 part of permethylated aminoethyl piperazine, about 0.3 part of the polysiloxane polyalkylene glycol ester of Example 1 and about 6 parts of sodium-castor oil sulphate having 50% water. About 112 parts of 4,4'-diphenylmethane diisocyanate (90%) are added to this mixture, which is introduced into molds. A fine-pored non-shrinking hard foam material is obtained, which has the following physical properties:

Weight per unit volume _____ kg./m.³__ 34
Compressive strength _____ kg./cm.²__ 2
Impact toughness _____ kg./cm__ 0.5
Hot bending strength _____ ° C__ 140
Water absorption _____ percent__ 4

*Example 16*

About 90 parts of the polyester A15 are intimately mixed with about 10 parts of propoxylated ethylene diamine (OH number about 720), about 1.5 parts of permethylated aminoethyl piperazine, about 0.3 part of polysiloxane polyalkylene glycol ester and about 6 parts of sodium castor oil sulphate (about 50 percent water). After addition of about 119 parts of 4,4'-diphenyl methane diisocyanate (about 90 percent) the mixture is filled into molds, wherein is obtained a fine-pored hard foam material with the following properties:

Weight per unit volume _____ kg./m.³__ 42
Compressive strength _____ kg./cm.²__ 1.8
Impact toughness _____ kg./cm__ 0.3
Hot bending strength _____ ° C__ 118
Water absorption _____ percent__ 2.7

*Example 17*

About 100 parts of the polyester A16 are intimately stirred with about 1 part of permethylated aminoethyl piperazine, about 0.3 part of polysiloxane polyalkylene glycol ester and about 6 parts of sodium castor oil sulphate (about 50 percent). After addition of about 109 parts of 4,4′-diphenyl methane diisocyanate (about 90 percent) the mixture begins to foam. A hard foam material with the following physical properties is obtained:

Weight per unit volume _____ kg./m.³__ 41
Compressive strength _____ kg./cm.²__ 1.9
Impact toughness _____ kg./cm__ 0.5
Hot bending strength _____ ° C__ 104
Water absorption _____ percent__ 2.2

*Example 18*

About 80 parts of the polyester A17 are mixed with about 20 parts of propoxylated ethylene diamine (OH number about 450), about 0.3 part of polysiloxane polyalkylene glycol ester and about 6 parts of sodium castor oil sulphate (about 50 percent water). With the addition of about 140 parts of 4,4′-diphenyl methane diisocyanate (about 90 percent) the mixture foams and a fine-pored hard foam material with the following properties is obtained:

Weight per unit volume _____ kg./m.³__ 43
Compressive strength _____ kg./cm.²__ 2.7
Impact toughness _____ kg./cm__ 0.4
Hot bending strength _____ degrees__ 126
Water absorption _____ percent__ 2.8

*Example 19*

About 70 parts of the polyester A18 are intimately mixed with about 30 parts of propoxylated trimethylol propane (OH number about 380), about 1.5 parts of ethylmorpholine, about 0.3 part of polysiloxane polyalkylene glycol ester and about 6 parts of sodium castor oil sulphate (about 50 percent water).

After addition of about 128 parts of a modified polyisocyanate containing 40.1 percent NCO groups and having a viscosity of 18 cp./25°, which is prepared by adding a mixture of about 1900 parts of methylate and about 50 parts of borontrifluoride etherate, to about 43,500 parts of toluylene diisocyanate (the ratio of the 2.4- and 2.6-isomer mixture is 65:35) and about 200 parts of borontrifluoride etherate (as described in German Patent 1,072,385), the mixture begins to foam and a fine-pored hard foam material with the following physical properties is obtained:

Weight per unit volume _____ kg./m.³__ 38
Compressive strength _____ kg./cm.²__ 1.3
Impact toughness _____ kg./cm__ 0.4
Hot bending strength _____ degrees__ 127
Water absorption _____ percent__ 2.5

*Example 20*

About 100 parts of the polyester A19 are mixed by stirring with about 1 part of permethylated aminoethyl piperazine, about 0.3 part of polysiloxane polyalkylene glycol ester and about 6 parts of sodium castor oil sulphate (about 50 percent water). The mixture is foamed with the addition of about 120 parts of a modified polyisocyanate containing 40.1 percent NCO groups and having a viscosity of 18 cp./25°, which is prepared by adding a mixture of about 1900 parts of methylate and about 50 parts of borontrifluoride etherate to about 43,500 parts of toluylene diisocyanate (the ratio of the 2.4- and 2.6-isomer mixture is 65:35) and about 200 parts of borontrifluoride etherate (as described in German Patent 1,072,585). A tough hard foam material with the following mechanical properties is obtained:

Weight per unit volume _____ kg./m.³__ 37
Compressive strength _____ kg./cm.²__ 1.2
Impact toughness _____ kg./cm__ 0.3
Hot bending strength _____ degrees__ 126
Water absorption _____ percent__ 2.3

*Example 21*

About 70 parts of the polyester A20 are intimately mixed with about 30 parts of porpoxylated trimethylolpropane (OH number about 380), about 2 parts of dimethyl benzyl amine, about 0.3 part of polysiloxane polyalkylene glycol ester and about 6 parts of sodium castor oil sulphate (about 50 percent water). After addition of about 35 parts of 4,4′-diphenyl methane diisocyanate (about 90 percent) a tough hard foam material with the following physical properties is obtained:

Weight per unit volume _____ kg./m.³__ 41
Compressive strength _____ kg./cm.²__ 1.8
Impact toughness _____ kg./cm__ 0.4
Hot bending strength _____ degrees__ 135
Water absorption _____ percent__ 1.7

*Example 22*

About 90 parts of the starting material A are intimately mixed with about 10 parts of propoxylated ethylene diamine (OH number about 720), about 1 part of dimethyl benzyl amine, about 0.3 part of polysiloxane polyalkylene glycol ester and about 6 parts of sodium castor oil sulphate (about 50 percent water). After addition of about 112 parts of 4,4′-diphenyl methane diisocyanate (about 92 percent purity, about 32 percent NCO groups, entire chlorine content 0.5 percent, 0.2 percent hydrolizable chlorine) the mixture is filled into molds, wherein is obtained a fine-pored hard foam material with the following physical properties:

Weight per unit volume _____ kg./m.³__ 35
Compressive strength _____ kg./cm.²__ 1.4
Impact toughness _____ kg./cm__ 0.3
Hot bending strength _____ degrees__ 122
Water absorption _____ percent__ 2

*Example 23*

About 60 parts of the starting material A and about 40 parts of propoxylated ethylene diamine (OH number about 720) are stirred with about 0.5 part of polysiloxane polyalkylene glycol ester. The mixture is reacted with a solution of about 30 parts of trichlorofluoromethane in about 105 parts of 4,4′-diphenyl methane diisocyanate (about 90 percent). After filling into molds there is obtained a tough fine-pored hard foam material with the following mechanical properties:

Weight per unit volume _____ kg./m.³__ 32
Compressive strength _____ kg./cm.²__ 1.2
Impact toughness _____ kg./cm__ 0.4
Hot bending strength _____ degrees__ 118
Water absorption _____ percent__ 1.8

*Example 24*

About 100 parts of the polyhydroxyl compound A4 are intimately stirred with an activator mixture of about 2 parts of dimethyl benzyl amine, about 0.2 part of tin-2-octoate and about 6 parts of sodium castor oil sulphate (about 50 percent water). The mixture is filled into molds with the addition of about 120 parts of a toluylene diisocyanate (isomer ratio 2.4:2.6=65:35) containing 34 percent NCO groups, which have been chain-lengthened with branched polypropylene glycol (trimethylol propane:propylene oxide=1:5.5). A tough fine-pored foam with the following physical properties is obtained:

Weight per unit volume _____kg./m.³__ 38
Compressive strength _____kg./cm.²__ 3.1
Impact toughness _____kg./cm__ 0.5
Hot bending strength _____degrees__ 108
Water absorption _____percent__ 1.5

It is, of course, to be understood that any of the polyisocyanates set forth above may be used throughout the working examples for those specifically used therein. Further, any of the active hydrogen containing compounds based on colophony resins may be used in place of the specific examples used. Also, combinations of active hydrogen containing compounds can be altered utilizing the modified colophony resins in conjunction with others of the specific organic compounds containing active hydrogen atoms disclosed throughout the specification.

Although the intention has been described in considerable detail for the purpose of illustration, it is to be understood that variations may be made therein by those skilled in the art without departing from the spirit of the invention and the scope of the claims.

What is claimed is:

1. A method for preparing cellular polyurethane plastics which comprises reacting in a reaction mixture containing an inert gas, the Diels-Alder reaction product of colophony, a polyhydric alcohol and a dienophilic compound containing α,β-unsaturation and selected from the group consisting of unsaturated carboxylic acids, chlorides of unsaturated carboxylic acids, lower alkyl esters of unsaturated carboxylic acids, anhydrides of unsaturated carboxylic acids and unsaturated alcohols with an organic polyisocyanate.

2. The process of claim 1 wherein the dienophilic compound is an anhydride of an unsaturated carboxylic acid.

3. The process of claim 1 wherein the dienophilic compound is a lower alkyl ester of an unsaturated carboxylic acid.

4. The process of claim 1 wherein the dienophilic compound is an unsaturated carboxylic acid.

5. The process of claim 1 wherein the dienophilic compound is an unsaturated alcohol.

6. The process of claim 1 wherein said dienophilic compound is maleic acid.

7. The process of claim 1 wherein said dienophilic compound is maleic anhydride.

8. The process of claim 1 wherein said dienophilic compound is fumaric acid.

9. The process of claim 1 wherein said polyhydric alcohol is a polyethylene glycol of the formula

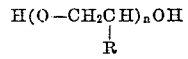

wherein R is a member selected from the group consisting of H and methyl and $n$ stands for one of the integers 2 to 6.

10. The process of claim 1 wherein said polyhydric alcohol is a mixture of polyethylene glycols of the formula

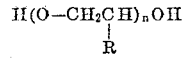

wherein R is a member selected from the group consisting of H and methyl and $n$ stands for one of the integers 2 to 6.

11. The process of claim 1 wherein said dienophilic compound is a member selected from the group consisting of unsaturated fatty acids and mixtures thereof.

12. A method for preparing cellular polyurethane plastics which comprises reacting in a reaction mixture containing an inert gas, the Diels-Alder reaction product of abietic acid, a polyhydric alcohol and a dienophilic compound containing α,β-unsaturation and selected from the group consisting of unsaturated carboxylic acids, chlorides of unsaturated carboxylic acids, lower alkyl esters of unsaturated carboxylic acids, anhydrides of unsaturated carboxylic acids and unsaturated alcohols with an organic polyisocyanate.

References Cited by the Examiner

UNITED STATES PATENTS 2,577,281  12/1951  Simon et al. _____ 260—2.5
2,938,006   5/1960  Root _____ 260—26
2,973,332   2/1961  Fikentscher et al. ____ 260—26

FOREIGN PATENTS 221,411   5/1959  Australia.

LEON J. BERCOVITZ, *Primary Examiner.*

WILLIAM H. SHORT, *Examiner.*

D. E. CZAJA, *Assistant Examiner.*